(12) United States Patent
Niimura

(10) Patent No.: US 9,253,263 B2
(45) Date of Patent: Feb. 2, 2016

(54) MANAGING SCOPE OF NETWORK SERVICES

(71) Applicant: Kenji Niimura, Santa Clara, CA (US)

(72) Inventor: Kenji Niimura, Santa Clara, CA (US)

(73) Assignee: Ricoh Company, Ltd., Tokyo (JP)

( * ) Notice: Subject to any disclaimer, the term of this patent is extended or adjusted under 35 U.S.C. 154(b) by 302 days.

(21) Appl. No.: 13/730,853

(22) Filed: Dec. 29, 2012

(65) Prior Publication Data

US 2014/0189116 A1 Jul. 3, 2014

(51) Int. Cl.
*G06F 15/173* (2006.01)
*H04L 29/08* (2006.01)

(52) U.S. Cl.
CPC ............ *H04L 67/16* (2013.01); *H04L 67/2871* (2013.01)

(58) Field of Classification Search
CPC ....................................................... H04L 67/16
USPC ................................................. 709/225–226
See application file for complete search history.

(56) References Cited

U.S. PATENT DOCUMENTS

| | | | |
|---|---|---|---|
| 7,428,578 B1 | 9/2008 | Hull et al. | |
| 8,065,713 B1 | 11/2011 | Vainstein et al. | |
| 2003/0081242 A1 | 5/2003 | Simpson et al. | |
| 2003/0234958 A1 | 12/2003 | Fritz et al. | |
| 2006/0067249 A1* | 3/2006 | Poustchi et al. | 370/260 |
| 2008/0130882 A1 | 6/2008 | Hagglund et al. | |
| 2009/0009802 A1 | 1/2009 | Shaw et al. | |
| 2010/0305855 A1 | 12/2010 | Dutton | |
| 2011/0055913 A1* | 3/2011 | Wong | 726/9 |
| 2011/0065451 A1 | 3/2011 | Danado et al. | |
| 2011/0093535 A1* | 4/2011 | Takakura et al. | 709/203 |
| 2011/0320610 A1* | 12/2011 | Ragunathan et al. | 709/227 |
| 2012/0036252 A1* | 2/2012 | Shi et al. | 709/224 |
| 2012/0054841 A1* | 3/2012 | Schultz et al. | 726/6 |
| 2012/0069386 A1 | 3/2012 | St. Laurent et al. | |
| 2012/0076118 A1* | 3/2012 | Montemurro et al. | 370/338 |
| 2012/0246319 A1* | 9/2012 | Um et al. | 709/226 |
| 2013/0019013 A1 | 1/2013 | Rice | |
| 2013/0104118 A1 | 4/2013 | Somani et al. | |
| 2013/0167037 A1* | 6/2013 | Xaio | 715/738 |
| 2013/0301073 A1 | 11/2013 | Niimura | |

(Continued)

OTHER PUBLICATIONS

Dempsey et al., Information Security Continous Monitoring (ISCM) for Federal Information Systems and Organizations, dated Sep. 2011, 80 pages.

(Continued)

*Primary Examiner* — Chris Parry
*Assistant Examiner* — Weiwei Stiltner
(74) *Attorney, Agent, or Firm* — Hickman Palermo Becker Bingham LLP; Daniel D. Ledesma

(57) ABSTRACT

Approaches are provided for managing scope of and access to network services. In one approach, a source device and a target device are each provisioned with a service connector that is configured to communicate with a service manager that executes on a device that is different than the source and target devices. Using its service connector, the source device is able to discover a network service hosted by the target device even though the source device and target device are in different subnets or networks. In another approach, a service manager limits which network services are visible to a source device even though the network services are hosted on target devices that are on the same subnet as the source device. In this approach, the source device uses a service connector to discover the service manager and receive a list of registered services hosted on one or more target devices.

20 Claims, 19 Drawing Sheets

(56) References Cited

U.S. PATENT DOCUMENTS

| | | | |
|---|---|---|---|
| 2013/0305314 A1 | 11/2013 | Niimura | |
| 2013/0318143 A1* | 11/2013 | Li | 709/201 |
| 2013/0318562 A1 | 11/2013 | Lv | |
| 2014/0007057 A1 | 1/2014 | Gill et al. | |
| 2014/0171190 A1* | 6/2014 | Diard | 463/31 |
| 2014/0348152 A1 | 11/2014 | Vanderhulst | |

OTHER PUBLICATIONS

Chadwick et al., The Permis X.509 Role Based Privilege Management Infrastructure, 2002, Elsevier Science BV, Pre-print version of future Generation Computer System. 936 dated Dec. 2002, 18 pages.

Bertino et al., "Location-Aware Authentication and Access Control-Concepts and Issues", 2009 International Conference on Advanced Information Networking and Applications, IEE, dated 2009, 6 pages.

Dempsey et al., "Information Security" Information Security Continuous Monitoring (ISCM) for Federal Information Systems and Organizations, dated Sep. 2011, 80 pages.

Jaros et al., "A New Approach in a Multifactor Authentication and Location-based Authorization", IARIA, dated 2011, 4 pages.

Ray et al., "LRBAC: A Location-Aware Role-Based Access Control Model", ICISS dated 2006, 15 pages.

Scarfone et al., "Guide to Enterprise Telework and Remote Access Security" Recommendations of the National Institute of Standards and Technology, dated Jun. 2009, 46 pages.

\* cited by examiner

| Service Type | Device ID | Service Name | IP Address/Port Number | Protocol Access Type | Scope of Service |
|---|---|---|---|---|---|
| Print | Device 720 | Target Device 720 Service 722 | 10.10.8.111/631 | TCP | Multi Segments |
| | Device 730 | Target Device 730 Service 732 | 10.10.10.123/631 | TCP | Multi Segments |
| | Device 740 | Target Device 740 Service 742 | 10.10.10.124/631 | TCP | Multi Segments |

| Service Type | Device ID | Service Name | IP Address/Port Number | Protocol Access Type | Scope of Service |
|---|---|---|---|---|---|
| Print | Device 730 | Target Device 730 Service 732 | 127.0.0.1/222 | TCP | Within Device |
| | Device 740 | Target Device 740 Service 742 | 127.0.0.2/222 | TCP | Within Device |
| | Device 750 | Target Device 750 Service 752 | 10.10.8.112/631 | TCP | Local network |
| | Device 720 | Target Device 720 Service 722 | 10.10.8.111/631 | TCP | Local network |

| Service Type | Target Device ID | Service Name | Service Connector IP Address/Port Number | Target Service IP Address/Port Number | Protocol Access Type |
|---|---|---|---|---|---|
| Print | Device 730 | Target Device 730 Service 732 | 127.0.0.1/222 | 10.10.10.123/631 | TCP |
| | Device 740 | Target Device 740 Service 742 | 127.0.0.2/222 | 10.10.10.124/631 | TCP |

| APPLICATION (Service Type) | OPERATION | USER/ GROUP | OPERATION DEVICE LOCATION | OPERATION DEVICE ATTRIBUTE | RELATED DEVICE(s) LOCATION | RELATED DEVICE(s) ATTRIBUTE | RULE ID |
|---|---|---|---|---|---|---|---|
| APPLICATION 1 | login() | Group1 | US/NY/office1 | ANY | N/A | N/A | App1_login_rule_ok |
| | | | US/NY/office2 | ANY | N/A | N/A | App1_login_rule_ok |
| | | | US/NY/public | Certified | N/A | N/A | App1_login_rule_ng |
| | | | US/NY/public | Un-Certified | N/A | N/A | App1_login_rule_ng |
| | | | UNKNOWN | ANY | N/A | N/A | App1_login_rule_ng |
| | | Group2 | N/A | ANY | N/A | N/A | App1_login_rule_ng |
| | listDocument() | ANY | US/NY/office1 | Certified | N/A | N/A | App1_listDoc_level1 |
| | | ANY | US/NY/office1 | Un-Certified | N/A | N/A | App1_listDoc_level2 |
| | | ANY | US/NY/office2 | Certified | N/A | N/A | App1_listDoc_level2 |
| | | ANY | US/NY/office2 | Un-Certified | N/A | N/A | App1_listDoc_level3 |
| | | ANY | US/NY/public | ANY | N/A | N/A | App1_listDoc_level3 |
| | | ANY | UNKNOWN | ANY | N/A | N/A | App1_listDoc_level4 |
| | print() | ANY | US/NY/office1 | Certified | US/NY/office1 | Certified | App1_print_at_office_confidential |
| | | ANY | US/NY/office1 | Un-Certified | US/NY/office1 | ANY | App1_print_at_office_default |
| | | ANY | US/NY/office2 | Certified | US/NY/office2 | Certified | App1_print_at_office_confidential |
| | | ANY | US/NY/office2 | Un-Certified | US/NY/office2 | ANY | App1_print_at_office_default |
| | | ANY | ANY | ANY | US/NY/office1 or US/NY/office2 | ANY | App1_print_at_office_default |
| | | ANY | ANY | ANY | US/NY/public | ANY | App1_print_to_public_place |
| APPLICATION 2 | operation1() | ANY | ANY | ANY | ANY | ANY | App2_operation1_default |
| | operation2() | ANY | ANY | ANY | N/A | N/A | App2_operation2_default |
| Print | serviceDiscovery() | Group1 | US/NY/office1 | ANY | N/A | N/A | Print_service_discovery_rule_for_office1_employee |
| | | ANY | US/NY/office2 | ANY | N/A | N/A | Print_service_discovery_rule_for_office2_employee |
| | | ANY | US/NY/office1 | ANY | N/A | N/A | Print_service_discovery_rule_for_office1_guest |
| | submitPrintJob() | ANY | US/NY/office1 or US/NY/office2 | ANY | N/A | N/A | Print_service_print_rule_for_print_inside_office |
| | | ANY | UNKNOWN | ANY | N/A | N/A | Print_service_print_rule_for_print_outside_office |
| | cancelprintJob() | ANY | US/NY/office1 | ANY | N/A | N/A | Print_services_cancel_rule |

FIG. 17

| RULE ID | RULE |
|---|---|
| App1_login_rule_ok | Verify user name and password |
| App1_login_rule_ng | Login false |
| App1_listDoc_level1 | Show the list of document whose security level is level1. |
| App1_listDoc_level2 | Show the list of document whose security level is level2 or upper |
| App1_listDoc_level3 | Show the list of document whose security level is level3 or upper |
| App1_listDoc_level4 | Show the list of document whose security level is level4 or upper |
| App1_print_at_office_confidential | If target document level is level1 |
| App1_print_at_office_default | If target document level is level1 |
| App1_print_to_office_default | If target document level is level1 |
| App1_print_to_public_place | If target document level is level2 or upper than level2 |
| Print_service_discovery_rule_for_office1_employee | Return print services which locates in office1 |
| Print_service_discovery_rule_for_office2_employee | Return print services which locates in office2 |
| Print_service_discovery_rule_for_office1_guest | Return print services which is located in office1's visitor conference room |
| Print_service_print_rule_for_print_inside_office | Execute Print and Black/White only |
| Print_service_print_rule_for_print_outside_office | Store Print Job and return release code |
| Print_service_cancel_rule | Cancel Print job |

FIG. 18

MANAGING SCOPE OF NETWORK SERVICES

RELATED APPLICATION DATA

This application is related to U.S. patent application Ser. Nos. 13/467,349 and 13/467,356 filed May 5, 2012, the contents of which are incorporated by reference in their entirety for all purposes as if fully set forth herein.

This application is related to U.S. patent application Ser. No. 13/730,854 entitled Managing Access of Network Services, filed Dec. 29, 2012, the contents of which are incorporated by reference in their entirety for all purposes as if fully set forth herein.

FIELD OF THE INVENTION

This invention relates generally to network services and, more specifically, to an approach for allowing a source device use a network service in a different network.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Network services (such as AirPrint) and discovery systems are becoming popular. Many users are connecting to network services from their mobile devices and network applications. Typically, discovery systems support the discovery of network services that are in the same network segment or subnet as the devices that request the network services. However, in order to support the discovery of network services that are in different network segments or subnets of the requesting devices, one of two approaches may be implemented.

In one approach, multicast routing is implemented at a router that connects two networks or subnets. Multicast routing allows multicast traffic to pass between the subnets. However, some routers or wireless access points do not support the multicast routing feature.

In another approach, a server with specialized software is deployed in each network or subnet. These servers allow packets from either network or subnet to be sent to the other network or subnet. However, deploying such servers or software for each network or subnet tends to be cumbersome.

SUMMARY

Techniques are provided for managing scope of and access to one or more network services. According to one technique, a service manager receives, over a network from a target device that resides in a first subnet, first service information that indicates a first service that the target device provides. In response to receiving the first service information, the service manager stores the first service information. The service manager receives, from a source device that resides in a second subnet that is different than the first subnet, a first request for service information. In response to receiving the first request, the service manager identifies the first service information, generates a response that includes the first service information, and sends the response to the source device.

According to another technique, a service manager stores service data that identifies a plurality of services that includes a first service that is located in a first subset. The service manager stores one or more rules that are associated with the service data. After storing the service data and the one or more rules, the service manager receives, from a source device in the first subnet, a request for available services. In response to receiving the request, the service manager identifies, based on at least one rule of the one or more rules, a subset of the plurality of services, where the subset does not include the first service. The service manager generates a response that includes a list of available services that identifies the subset of the plurality of services and not the first service. The service manager sends the response to the source device.

Embodiments may be implemented by instructions processed by one or more processors, one or more computer-implemented methods, or devices or apparatuses configured accordingly.

BRIEF DESCRIPTION OF THE DRAWINGS

In the figures of the accompanying drawings like reference numerals refer to similar elements.

FIG. 11 is a block diagram that depicts a table of network service information that is maintained at a source device, in an embodiment.

FIG. 13 is a block diagram that depicts a table of network service information that is maintained by a service connector at a source device, in an embodiment.

FIGS. 17 and 18 are block diagrams that depict associations between operations, users, locations, device attributes, and specific rules, in an embodiment.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

General Overview

Techniques are described herein for managing scope of and access to one or more network services. A target device that hosts a network service executes a service connector that is configured to communicate with a service manager that executes on a different device. The service manager stores service information about the network service and zero or more other network services. The service manager provides the service information to a source device that may request use of the network service. The service manager may provide the service information in response to a request from the source device for available services. The source device is thus able to discover the target device even though the target device and source device reside in different subnets.

In a related technique, a source device that executes a service connector requests available services from a service manager that executes on a different device. The service manager determines a list of network services that the source device is allowed to discover. The list of network services are determined based on one or more criteria, such as the current location of the source device, whether the source device is associated with authentication information, whether the source device has certain attributes, etc. In this way, the service manager is able to limit the network services that the source device is able to discover, even though the network services may reside in the same subnet at the source device.

Limited Scope Approach to Network Service Discovery

Figure 1:
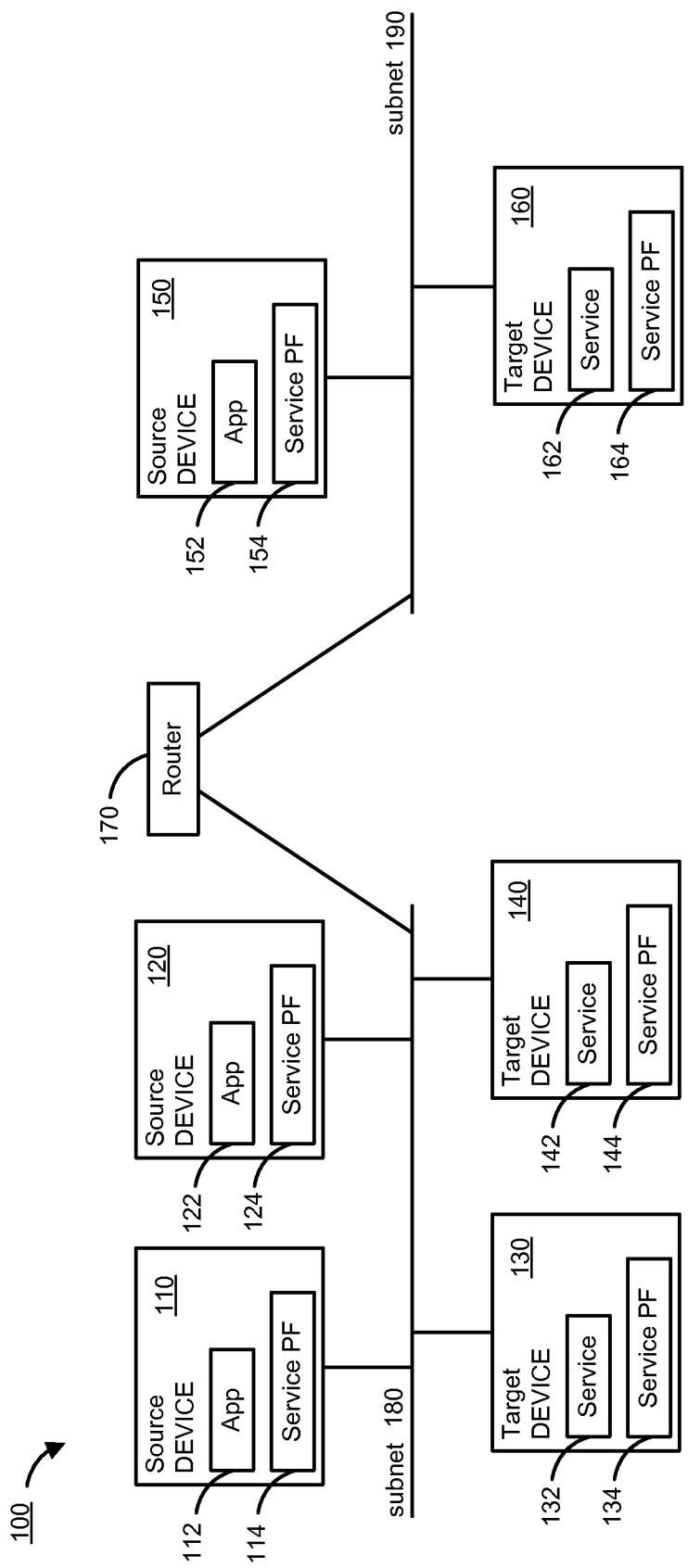
FIG. 1 is a block diagram that depicts an example network architecture.

As noted previously, multiple approaches may be used to discover network services. FIG. 1 is a block diagram that depicts an example network architecture 100 where a source device is only able to discover services that are within the same subnet as the source device. Network architecture 100 includes two subnets: subnet 180 and subnet 190. Subnets 180 and 190 are communicatively coupled by router 170. Subnet 180 includes source devices 110 and 120 and target devices 130 and 140. Subnet 190 includes source device 150 and target device 160. Source devices 110, 120, and 150 include, respectively, applications 112, 122, and 152 that may request one or more services 132, 142, and 162 hosted, respectively, by target devices 130, 140, and 160.

Each device depicted in FIG. 1 includes a service platform through which applications (in the case of source devices) or services (in the case of target devices) send or request information.

Figure 2:
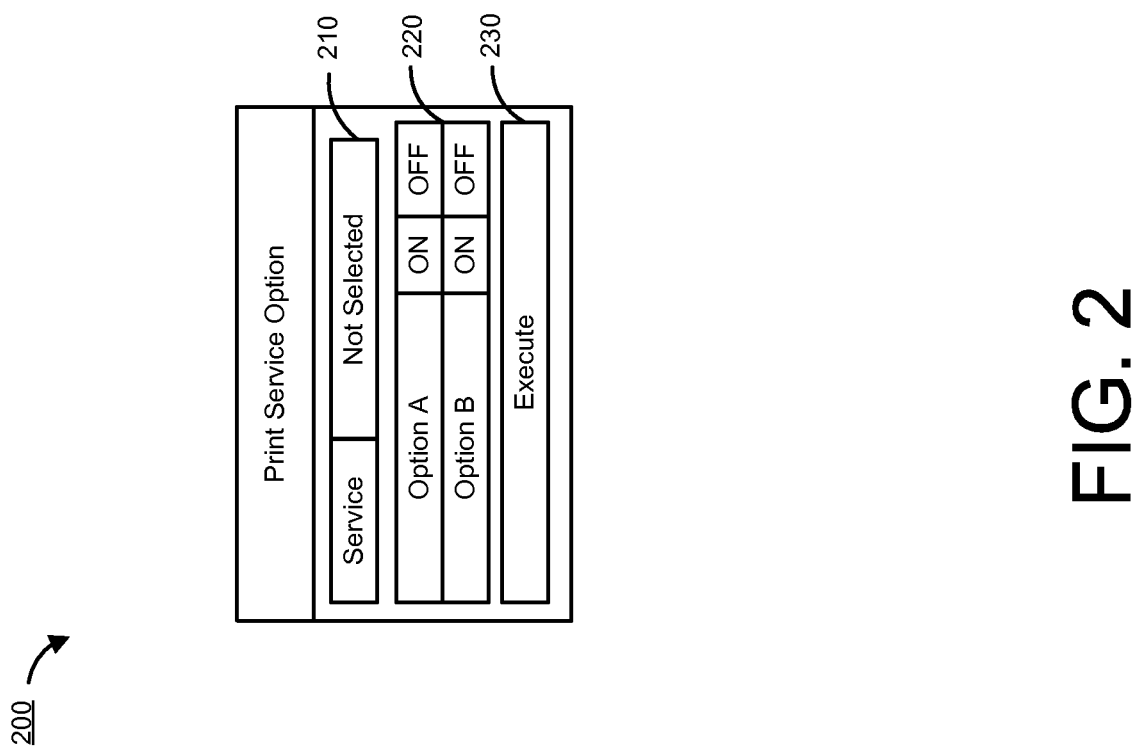
FIG. 2 is a block diagram that depicts an example screen that allows a user to select options for a print service.
Figure 3:
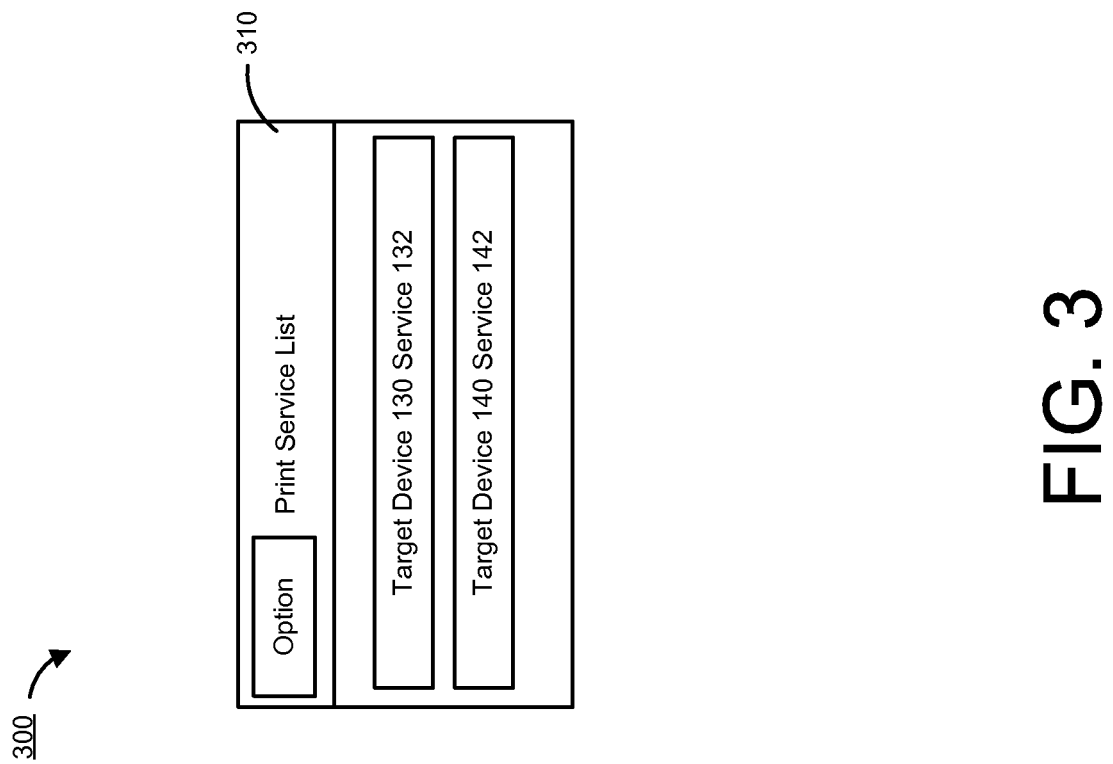
FIG. 3 is a block diagram that depicts an example screen that indicates available network services.

FIG. 2 is a block diagram that depicts an example screen 200 that allows a user to select options for a print service. Screen 200 may be generated on source device 110 by application 112. Screen 200 includes a button 210 that allows the user to select a service. For example, selection of screen 200 causes screen 300 depicted in FIG. 3 to be displayed on source device 110.

Screen 300 includes a list 310 of print services that have been registered with source device 110. List 310 identifies service 122 of target device 120 and service 132 of target device 130. Noticeably, list 310 does not include service 152 of target device 150 because target device 150 is in a different subnet than source device 110.

Returning to screen 200 of FIG. 2, screen 200 includes a list 220 of print options that the user is able to select. Screen 200 also includes an execute button 230 that, when selected, causes a print job that indicates the selected options to be submitted to the selected service. Again, the selected service is limited to the services that are discovered in subnet 180.

Figure 4:
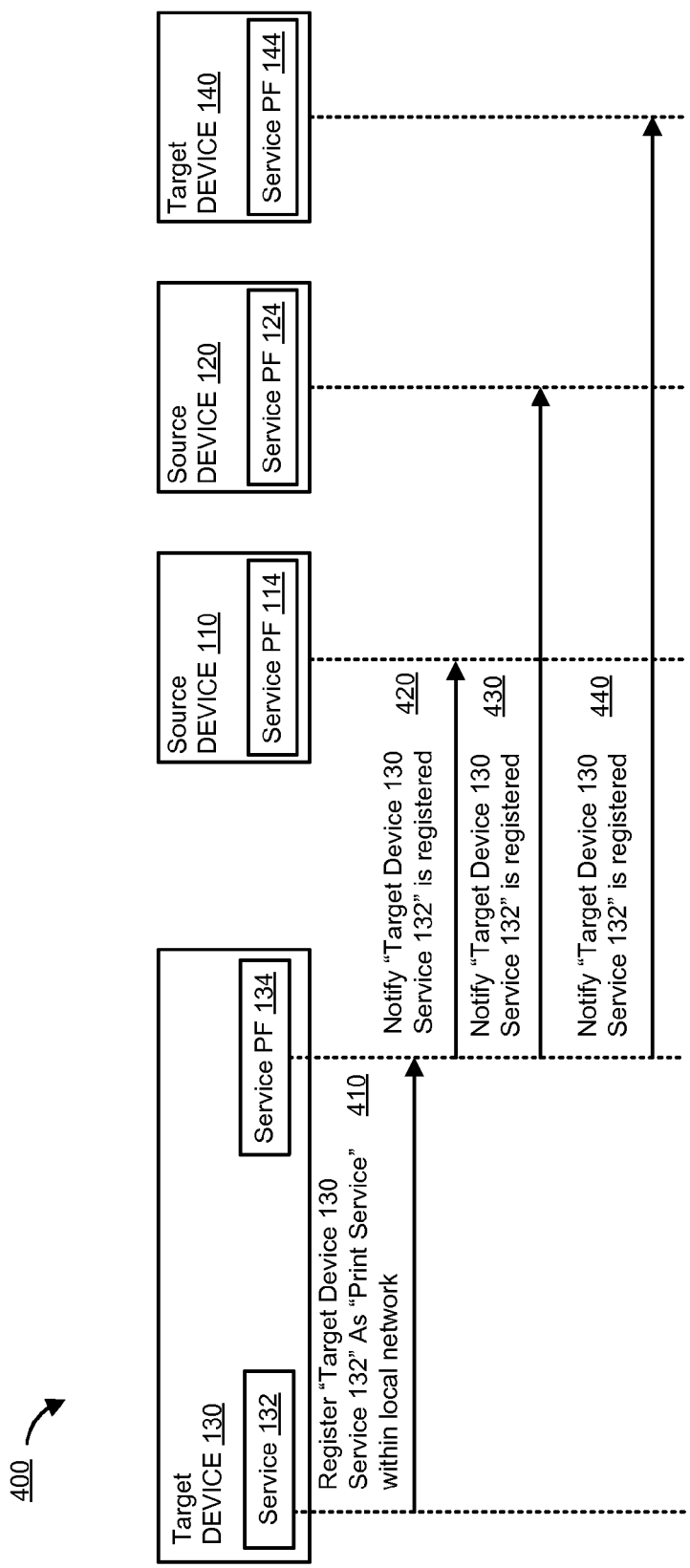
FIG. 4 is a sequence diagram that depicts a network service registration sequence within the same subnet.

FIG. 4 is a sequence diagram that depicts a network service registration sequence 400 within the same subnet. At step 410, service 132 sends a registration request to service platform 134. At steps 420-440, service platform 134 notifies each service platform of devices on subnet 180, which, in the depicted example, include source device 110, source device 120, and target device 140.

Figure 5:
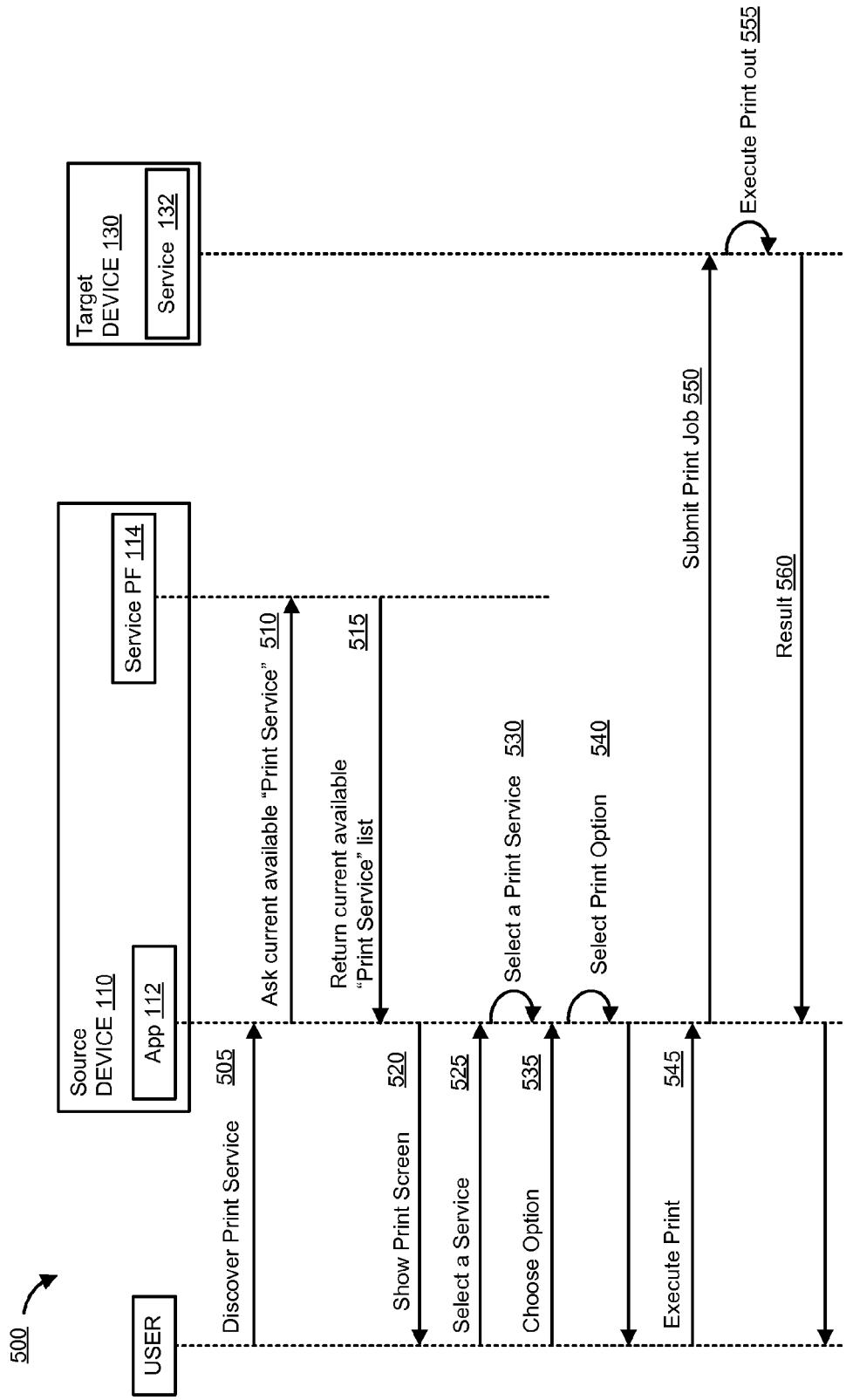
FIG. 5 is a sequence diagram that depicts a network services discovery sequence and a network services execution sequence.

FIG. 5 is a sequence diagram that depicts a network services discovery sequence 500 and a network services execution sequence. At step 505, a user provides, to application 112, input that initiates discovery of print services. At step 510, in response, application 112, sends a request to service platform 114. The request is for available print services. At step 515, in response, service platform 114 returns a list of one or more print services. At step 520, in response, application 112 generates a screen that indicates the list and causes the screen to be displayed on source device 110. At step 525, the user provides, to application 112, input that indicates a selection of one of the print services listed in the displayed list. At step 530, in response, application 112 selects the user-selected print service. At step 535, the user provides, to application 112, input that indicates selection of one or more print options. At step 540, in response, application 112 selects the user-selected print option(s). At step 545, the user provides, to application 112, input that indicates execution of a print job. At step 550, in response, application 112 submits the print job (that identifies the selected print service and the selected print option(s)) to service 132 hosted by target device 130. At step 555, service 132 executes the print job and generates a result. At step 560, service 132 sends the result to application 112, which may cause information about the result to be displayed.

Service Discovery Using Specially-Configured Servers in Each Subnet

Figure 6:
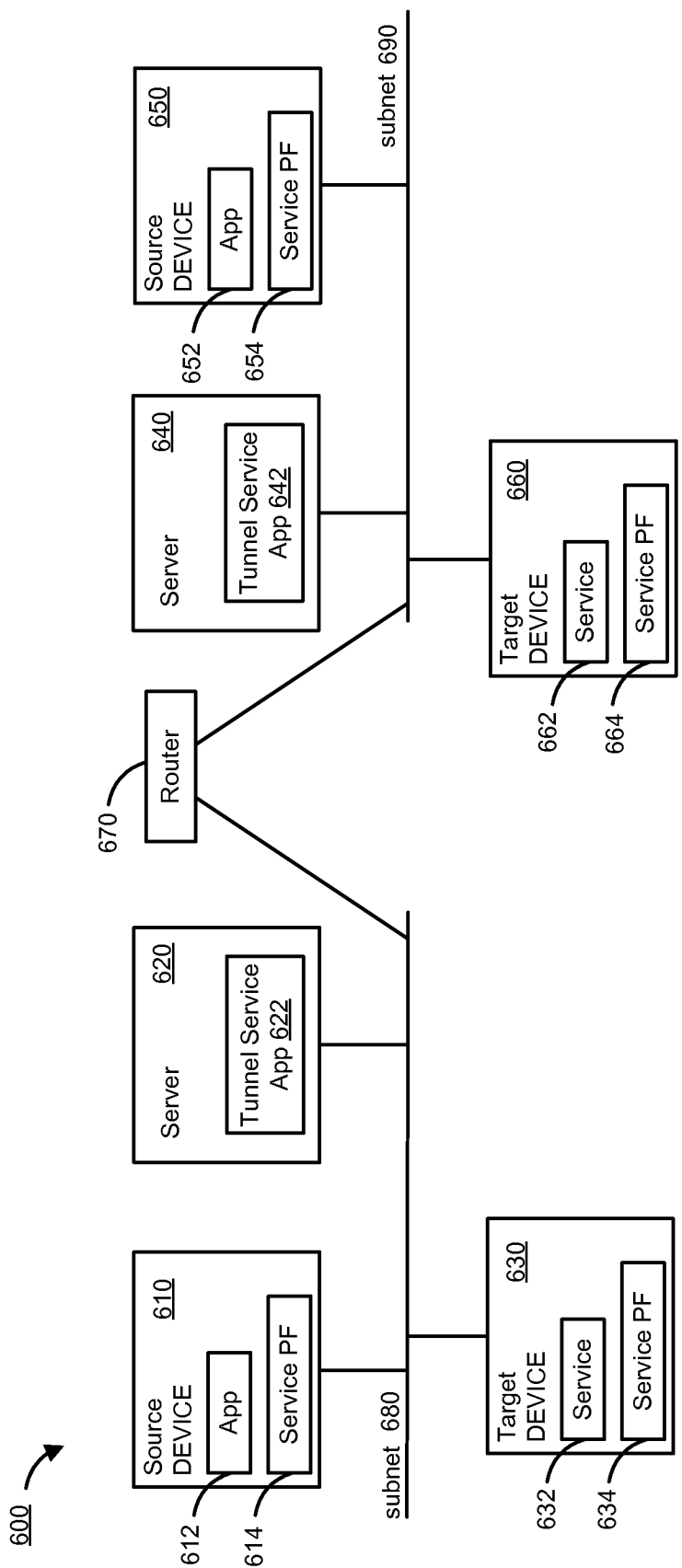
FIG. 6 is a block diagram that depicts an example network architecture that uses a server application in each subnet to allow discovery of network services in different subnets.

FIG. 6 is a block diagram that depicts an example network architecture 600 that uses a server application in each subnet to allow discovery of network services in different subnets. Network architecture 600 is similar in some respects to network architecture 100. Network architecture 600 includes two subnets: subnet 680 and subnet 690. Subnets 680 and 690 are communicatively coupled to router 670. Subnet 680 includes source device 610 and target device 630. Subnet 690 includes source device 650 and target device 660. Source devices 610 and 650 include, respectively, applications 612 and 652 that may request one or more of services 632 and 662 hosted, respectively, by target devices 630 and 660.

Each source device and target device depicted in FIG. 6 includes a service platform through which applications (in the case of source devices) or services (in the case of target devices) send or request information.

Network architecture 600 also includes a server 620 located in subnet 680 and a server 640 located in subnet 690. Server 620 includes a tunnel service application 622 and server 640 includes a tunnel service application 642. Tunnel service applications 622 and 642 are used to allow discovery of network services in both subnets. Thus, source device 610 may discover service 662 hosted by target device 660 and source device 650 may discover service 632 hosted by target device 630.

Service Discovery Using Service Connectors

Figure 7:
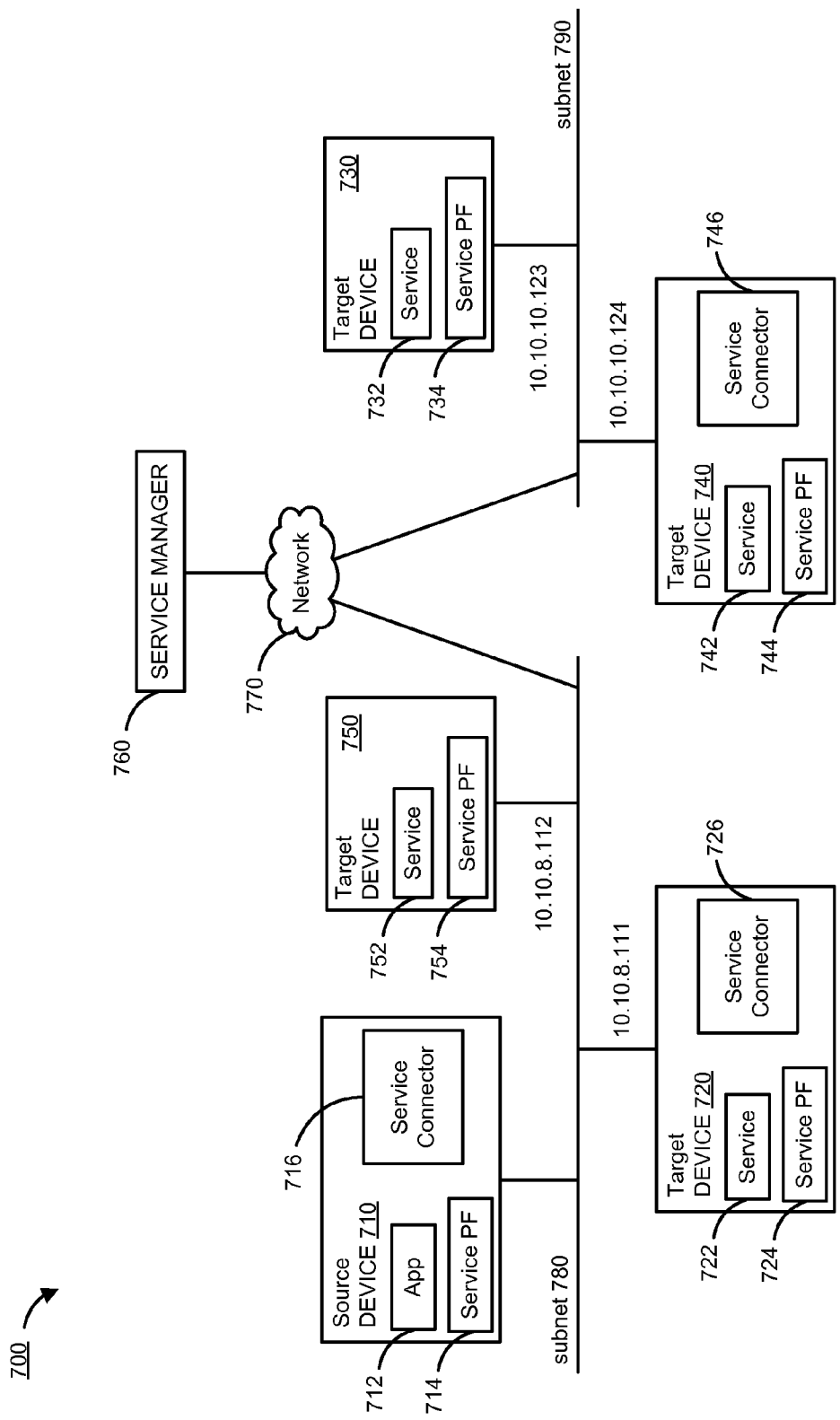
FIG. 7 is a block diagram that depicts an example network architecture that allows devices in one subnet to discover network services in another subnet, in an embodiment.

FIG. 7 is a block diagram that depicts an example network architecture 700 that allows devices in one subnet to discover network services in another subnet, in an embodiment. Network architecture 700 includes a service manager 760, network 770, and two subnets: subnet 780 and subnet 790, which are communicatively coupled by subnets 780 and 790.

Subnet 780 includes source device 710 and target devices 720 and 750. Subnet 790 includes target devices 730 and 740. Source device 710 includes application 712, which may request one or more services 722, 732, 742, and 752 hosted, respectively, by target devices 720-750. Examples of services 722, 732, 742, and 752 include print services, fax services, scan services, and archive services. Examples of application 712 include a word processing application and an image processing application, each of which may request a, for example, print service for printing one or more documents or images.

Network 770 may be implemented by any medium or mechanism that provides for the exchange of data between source device 710 and target devices 720-750. Examples of network 770 include, without limitation, a network such as a Local Area Network (LAN), Wide Area Network (WAN), Ethernet or the Internet, or one or more terrestrial, satellite or wireless links.

Each device depicted in FIG. 1 includes a service platform. Specifically, source device 710 includes service platform 714 and target devices 720-750 include, respectively, service platforms 724-754. A service platform stores information about services that are "known" to the service platform. A service platform shares/advertises service information (which is registered to the service platform) with other service platforms on the same subnet. The service information may include an IP address for each service, a port number for each service, a name of each service, a device identifier of a device that hosts each service, etc. An application (e.g., application 712) executing on a device can query the service platform (e.g., service platform 714) that is also on the device in order to retrieve information regarding known services.

Source device 710 also service connector 716. Service connector 716 communicates with service manager 760 to retrieve information about network services, regardless of whether the network services are in the same or different subnet as source device 710. Target devices 720 and 740 include, respectively, service connector 726 and 746. Service connectors 726 and 746 communicate with service manager 760 to inform service manager 760 regarding their respective hosted services (i.e., services 722 and 742). Service manager 760 stores service information that identifies services 722 and 742 and allows source devices from either subnet to query service manager 760 regarding network services that are available in either subnet. In this way, two specially-configured servers are not required in each subnet in order to allow the discovery of network services in each subnet.

In an embodiment, one or more of service connectors 716, 726, and 746 are configured to communicate with their respective service platforms when one or more of service connectors 716, 726, and 746 are notified of services that are hosted on their respective devices. In this way, those service connector(s) can retrieve information regarding those services from their respective service platforms and inform service manager 760 of those hosted services.

Service connectors 716, 726, and 746 may be implemented in software, hardware, or any combination of software and hardware. Service connectors 716, 726, and 746 may be hard coded to include an identifier of service manager 760. Alternatively, service connectors 716, 726, and 746 may be configured to automatically discover an address of service manager 760. For example, upon detection of a new network, service connector 716 may send, through the network, a discovery message that conforms to a particular format that is recognizable by service manager 760, which responds with a discovery response that includes address information that service connector 716 may use to communicate with service manager 760.

Service Information Maintained by Service Manager

Figure 8:
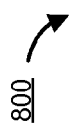
FIG. 8 is a block diagram that depicts a table of network service information that is maintained by a service manager, in an embodiment.

FIG. 8 is a block diagram that depicts a table 800 of network service information that is maintained by service manager 760, in an embodiment. Table 800 includes six columns for six different types of information: service type, device identifier, service name, IP address and port number, protocol access type, and scope of service. In the depicted example, table 800 includes three rows or entries. Each entry corresponds to a different service. In the depicted example, each service is of type print. In other embodiments, examples of service type may include fax, scan, and archive. The three entries identify, respectively, target device 720, target device 730, and target device 740. Table 800 does not include an entry for target device 750 because target device 750 does not have a service connector, which would have automatically registered target device 750 with service manager 760. Even though target device 730 also does not have a service connector, table 800 includes an entry for target device 730. This situation is possible if, for example, an administrator manually registers target service 732 with service manager 760.

Regarding protocol access type, in the depicted example TCP is identified. Another example of a protocol access type is UDP. Some target services may support both TCP and UDP.

Regarding scope of service, in the depicted example "multi segments" is identified. Another example of scope of a service is "single segment." If a target service is associated with "single segment," then that indicates that source devices in a different segment or subnet relative to the target service are not allowed to access that target service. Another example of "scope of service" is a specific IP address. If a target service is associated with a specific IP address, then only source device(s) associated with the specific IP address are allowed to access that target service. Service manager 760 and/or a service connector may do access control using the "scope of service" value.

Network Service Registration

Figure 9:
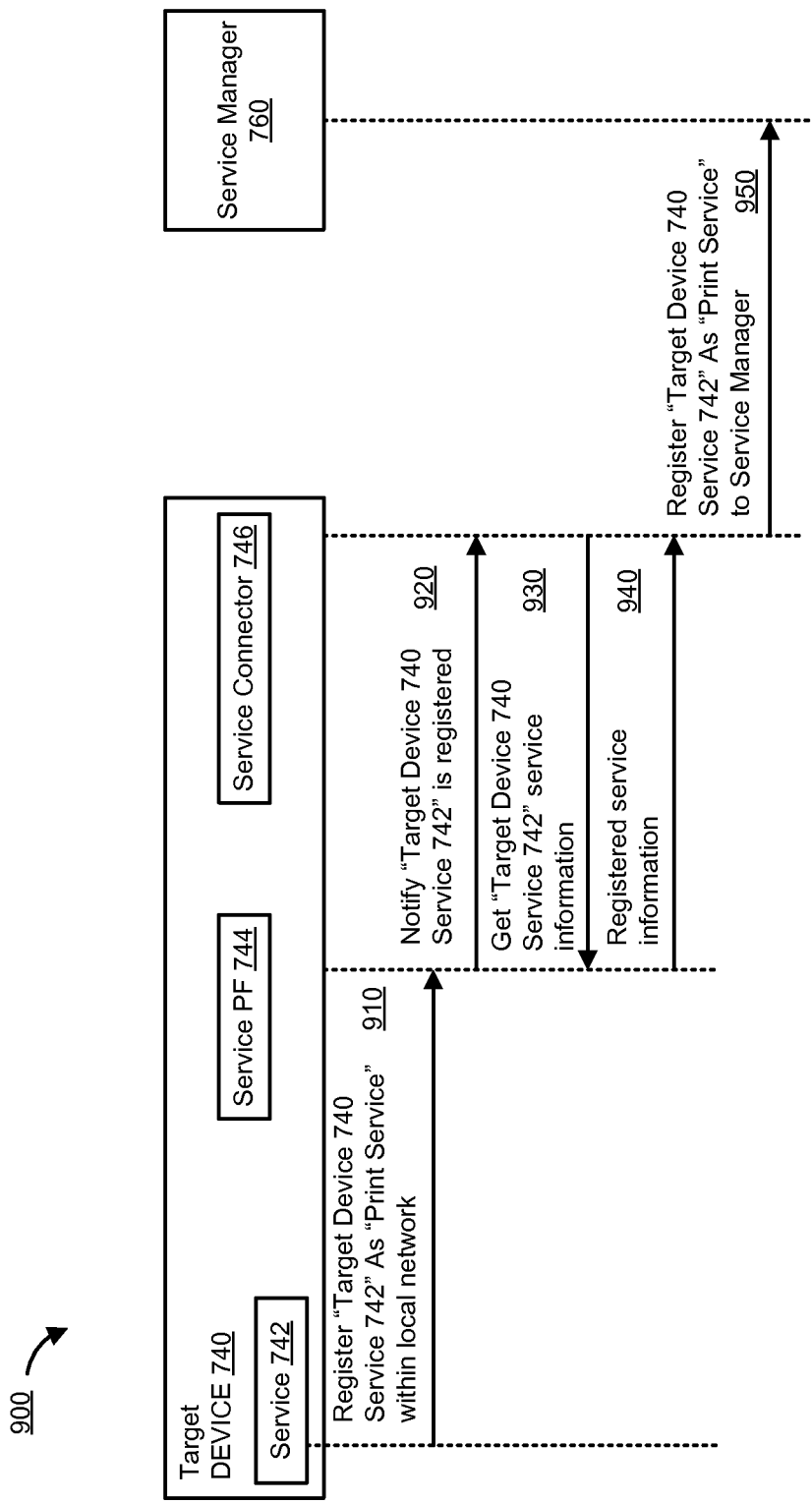
FIG. 9 is a sequence diagram that depicts how a network service registers with a service manager, in an embodiment.

FIG. 9 is a sequence diagram that depicts how a network service registers with service manager 700, in an embodiment. Although FIG. 9 refers to target device 740, other target devices depicted in FIG. 7 may be involved instead. Alternatively, FIG. 9 is applicable to each target device depicted in FIG. 7.

At step 910, service 742 sends a register request message to service platform 744. Service 742 may be configured to communicate with its associated service platform when service 742 begins executing on a device.

At step 920, in response, service platform 744 notifies service connector 746 that service 742 is registered at target device 740. Service platform 744 may be configured to communicate with service connector 746 each time service platform 744 is notified of another hosted service on target device 740.

At step 930, in response, service connector 746 requests service information regarding service 742 from service platform 744. Examples of such service information are provided in table 800, such as IP address and port number and service type.

At step 940, service platform 744 sends service information about service 742 to service connector 746. At step 950, service connector 746 sends, to service manager 760, a register message that includes the requested service information from service platform 744. Service manager 760 stores the service information in a table, such as table 800.

In an embodiment, service connector 746 sends the service information to service manager 760 in response to receiving the service information from service platform 740. Alternatively, service connector 746 sends the service information to service manager 760 in response to a request from service manager 760. For example, service manager 760 may (regularly) poll target devices in subnets 780 and 790 for current service information.

Network Service Discovery

Figure 10:
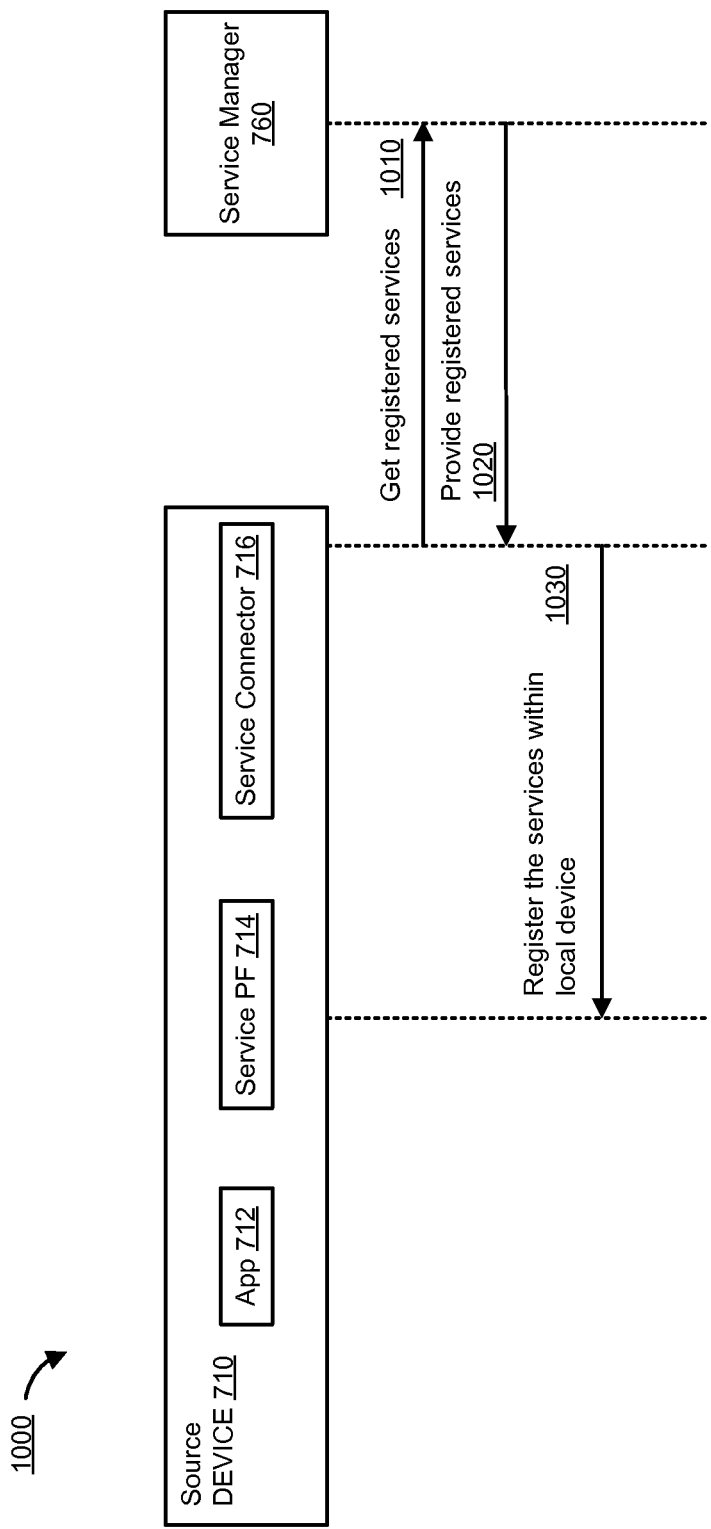
FIG. 10 is a sequence diagram that depicts how to discover network services, in an embodiment.

FIG. 10 is a sequence diagram that depicts how a source device discovers network services, in an embodiment. Although FIG. 9 refers to source device 710, other source devices (not depicted) may be involved instead.

At step 1010, service connector 716 on source device 710 sends a services request to service manager 760. Service connector 716 may send the services request regularly or in response to certain internal events. Alternatively, the services request may be generated in response to a message (e.g., an event notification to which service connector 716 subscribed) from service manager 760.

At step 1020, in response to the services request, service manager 760 identifies one or more registered services (e.g., in table 800) and sends a response to service connector 716. In an embodiment, the response includes, for registered service, a type of the service, a device identifier, a service name, an IP address and port number, a protocol access type, and a scope of service.

At step 1030, service connector 716 sends, to service platform 714, service information about each registered service identified in the response from service manager 760. In an embodiment, the service information (of a particular service) that service connector 716 sends to service platform is different relative to the service information (of that particular service) received from service manager 760. For example, step 1030 may involve service connector 716 generating a dummy IP address and replacing an actual IP address of a registered service (identified in the service information from service manager 760) with the dummy IP address. The process of replacing a real IP address of a network service with a dummy IP address may be performed for each registered service that is outside of the subnet of the requesting source device (i.e., source device 710 in this example). Thus, when the source device is source device 710, the replacing step may be performed for services 732 and 734 (which are in subnet 790, which is different than subnet 780) and not for services 722 and 752. The dummy IP address stored at source device 710 points to or references source device 710.

Service Information Maintained by Service Platform

FIG. 11 is a block diagram that depicts a table 1100 of network service information that is maintained at a source device, in an embodiment. Service platform 714 may be responsible for storing and maintaining table 1100. Later, application 712 may query service platform 714 for available services.

Table 1100 includes six columns for six different types of information: service type, a device identifier, service name, IP address and port number, protocol access type, and scope of service. In this example, source device 110 stores table 1100 in local storage. Each row in table 110 corresponds to a different service that service connector 716 discovers using service manager 760. The third row corresponds to service 752 hosted by target device 750. The fourth row corresponds to service 722 hosted by target device 720. As depicted in FIG. 7, target devices 720 and 750 are in the same subnet as source device 710. Thus, However, service information for services 732 and 742 have been changed (e.g., by service connector 716) prior to storing the service information in table 1100. Even though the first row of table 1100 corresponds to service 732 hosted by target device 730, the device identifier column identifies source device 710 and not target device 730. Similarly, even though the second row of table 1100 corresponds to service 742 hosted by target device 740, the device identifier column identifies source device 710 and not target device 740.

Also, the IP address column of table 1100 does not include the actual IP address and port numbers of services 732 and 742. The actual IP addresses for service 732 and 742 are, respectively, 10.10.10.123 and 10.10.10.124. Instead, a dummy IP address and port number appears in the IP address column of table 1100 for services 732 and 742. Disadvantages to using actual IP addresses and port numbers in table 1100 for services 732 and 742 include (1) the fact that current existing service registry systems do not allow such a scenario and (2) access control. Regarding the latter disadvantage, if, at block 1030 in FIG. 10, service connector 716 registers a service with an actual service address with service platform 714, then service platform 714 will automatically share this service registration information with other service platforms (e.g., 724 and 754) that are in the same segment or subnet as source device 710. It is difficult to do access control by using the existing service platform.

Figure 12:
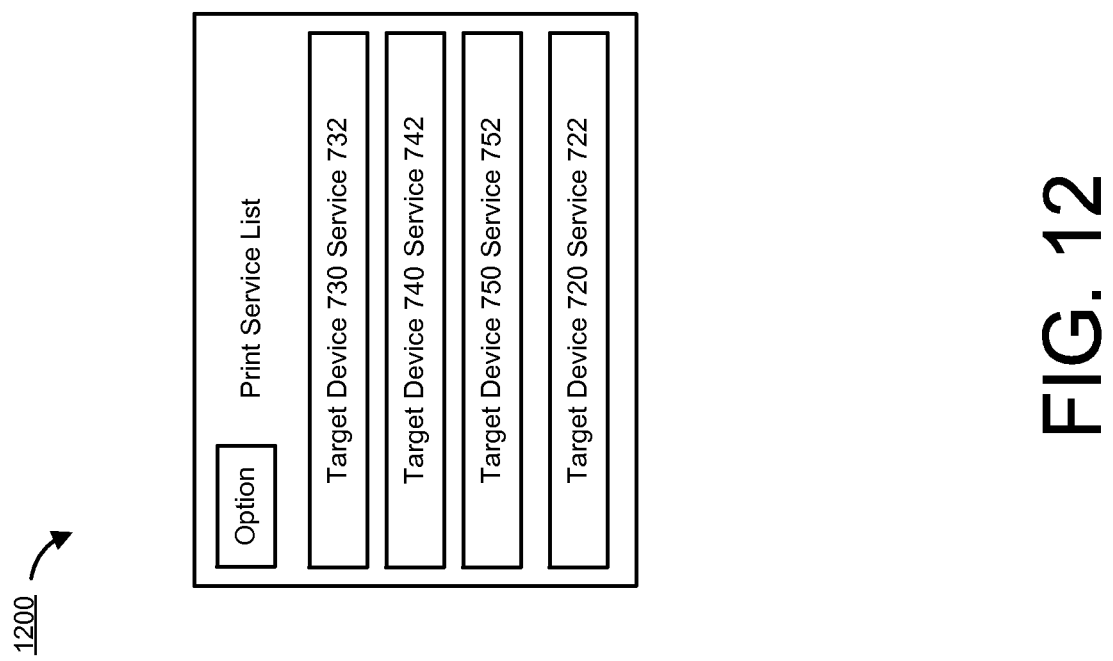
FIG. 12 is a block diagram that depicts an example screen that indicates available network services, in an embodiment.

FIG. 12 is a block diagram that depicts an example screen 1200 that indicates available network services, in an embodiment. In this example, source device 710 displays screen 1200. Screen 1200 includes a list of four services: services 732, 742, 752, and 722. Services 732 and 742 are listed even though services 732 and 742 appear in a different subnet than source device 710. User selection of one of the listed services indicates that a user desires the selected service to perform one or more functions, such as a printing function, a scanning function, etc.

Service Information Maintained by Service Connector

FIG. 13 is a block diagram that depicts a table 1300 of network service information that is maintained by a service connector at a source device, in an embodiment. In this example, the source device is source device 710 and the service connector is service connector 716.

Table 1300 includes six columns that contain six different types of information: service type, target device identifier, service name, service connector IP address and port number, target service IP address and port number, and protocol access type. In this example, table 1300 only includes two rows or entries, one for each service that is in a different subnet than source device 710.

In an embodiment, if a service connector receives a request that identifies a service that is identified in the service connector IP address column in table 1300, then the service connector replaces that address with the corresponding address in the target service IP address column. For example, service connector 716 receives a service request that includes the IP address and port number 127.0.0.1/122, determines that 127.0.0.1/122 is in the first entry of table 1300, replaces, in the service request, 127.0.0.1/122 with 10.10.10.123/631, and sends the modified service request to the destination associated with 10.10.10.123/631.

Accessing a Service in Another Subnet

Figure 14:
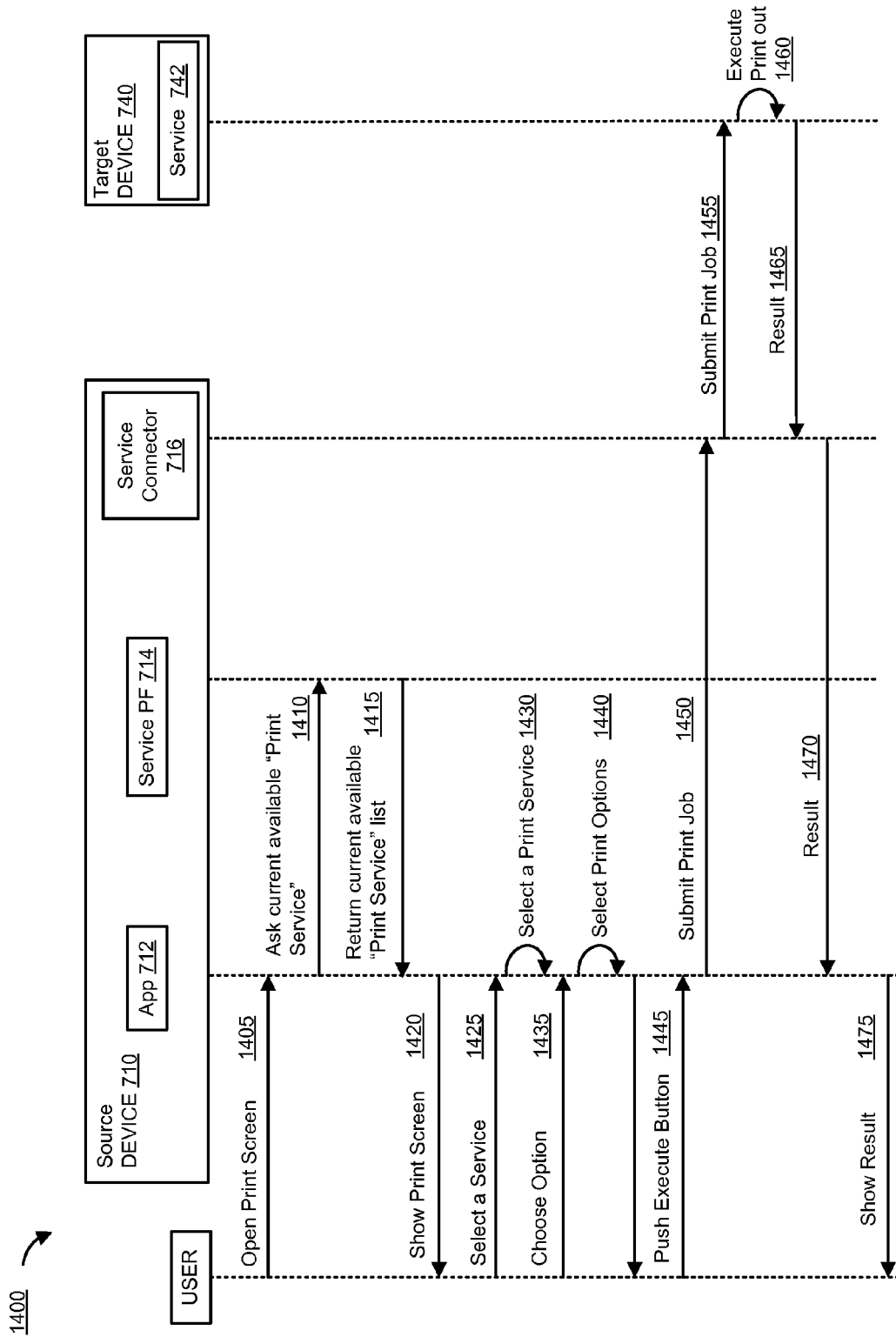
FIG. 14 is a sequence diagram that depicts how a network service in another subnet is accessed from a source device, in an embodiment.

FIG. 14 is a sequence diagram 1400 that depicts how a network service in another subnet is accessed from a source device, in an embodiment. In this example, the network service is service 742 and the source device is source device 710.

At step 1405, a user provides, to application 712, input that indicates a request to display a print screen on source device 710. At step 1410, in response, application 712 sends, to service platform 714, a request for a list of currently available print services.

At step 1415, in response, service platform 714 returns a list of currently available print services to application 712. Step 1415 may involve service platform identifying table 700 and reading the entries or rows of table 700.

At step 1420, in response to receiving the list, application 712 causes a print screen to be displayed. The print screen may be screen 1200 depicted in FIG. 12.

At step 1425, the user "selects" one of the listed services. In other words, the user provides input that indicates a selection of service display data that identifies one of the services listed on the print screen. At step 1430, application 712 stores service selection data that indicates that the service that the user selected.

At step 1435, the user selects one or more options. This step may involve selecting print options such as size of printed media (e.g., paper), orientation, duplex printing, color or gray scale, etc.

At step 1440, in response, application 712 stores option selection data that indicates the options that the user selected.

At step 1445, the user selects an "Execute" or "Print" button, such as Execute button 230 depicted in FIG. 2.

At step 1450, in response, application 712 submits a print job that is based on the selected service and the selected options. In this example, the selected service is service 742, which is hosted on target device 740, which is in a different subnet than the subnet in which source device 710 is located. Thus, the IP address associated with service 742 is a dummy IP address, such as 127.0.0.2 as indicated in table 1300. Such a dummy address indicates that the corresponding service is available on the device upon which the dummy IP address is stored. At step 1450, service connector 716 receives the print job sent from application 712.

At step 1455, service connector 716 submits the print job to service 742. Step 1455 may involve service connector 716 determining whether the destination IP address (of the target device) indicated in the print job is a dummy IP address. Service connector 716 may make this determination by, for example, comparing the destination IP address with service connector IP addresses indicated in table 1300. In this example, the destination IP address and port number is 127.0.0.2/222 and service connector 716 replaces the destination IP address and port number with 10.10.10.123/631.

If, for example, the target service is service 752, then service connector 716 would not find a match for the destination IP address (indicated in the print job) in table 1300 because the IP address associated with service 752 in table 1100 is the actual IP address of service 752 and not a dummy IP address.

At step 1460, service 742 receives the print job from source device 710 and executes the print job. Executing the print job may involve service 742 causing one or more documents to be printed with information reflected in print data of the print job.

At step 1465, service 742 generates a result of executing the print job and sends the result to service connector 716. The result may be an indication of whether the print job executed successfully.

At step 1455, service connector 716 may have recorded service request history data that indicates from which services service connector 716 is expecting results. Then, at step 1465, service connector 716 determines, based on the service request history data, that the result data received from service 742 corresponds to a print job submitted by application 712.

Alternatively, in response to receiving the result data in step 1465, service connector 716 identifies an IP address of the sender, which, in this example, is 10.10.10.124 and compares the IP address to target IP addresses indicated in table 1300. If the IP address of the sender is found in table 1300, then step 1465 may involve service connector 716 replacing that IP address with the corresponding service connector (or dummy) IP address. In this example, the dummy IP address is 127.0.0.2.

At step 1470, service connector 716 sends the result data to application 712. The result data may include the dummy IP address indicated in table 1300.

At step 1475, application 712 causes the result (e.g., success or failure) indicated in the result data to be displayed to the user.

In a related embodiment, instead of service connector 716 submitting the print job to service 742 directly at step 1455, service connector 716 sends the print job to service manager 760. Service manager 760 inspects the print job to determine to which target device to forward the print job. In response to determining that target service 742 is the intended destination for the print job, service manager 760 sends the print job to target service 742. Target service, after executing the print job, may send the result (e.g., a successful or unsuccessful indication) to (a) service manager 760, which would forward the result to service connector 716 or (b) service connector 716, effectively bypassing service manager 760. This embodiment of service connector 716 submitting the print job through service manager 760 is useful if source device 710 is unable to access target device 740 directly due to some network setting.

Managing Access to Network Services

As noted previously, mobile devices and network applications are commonly used. Currently, however, when using network services (such as "Airprint") from a mobile device, there is no authentication and authorization mechanism. As a result, any mobile or other device in a subnet is able to use any network service in the same subnet.

Figure 15:
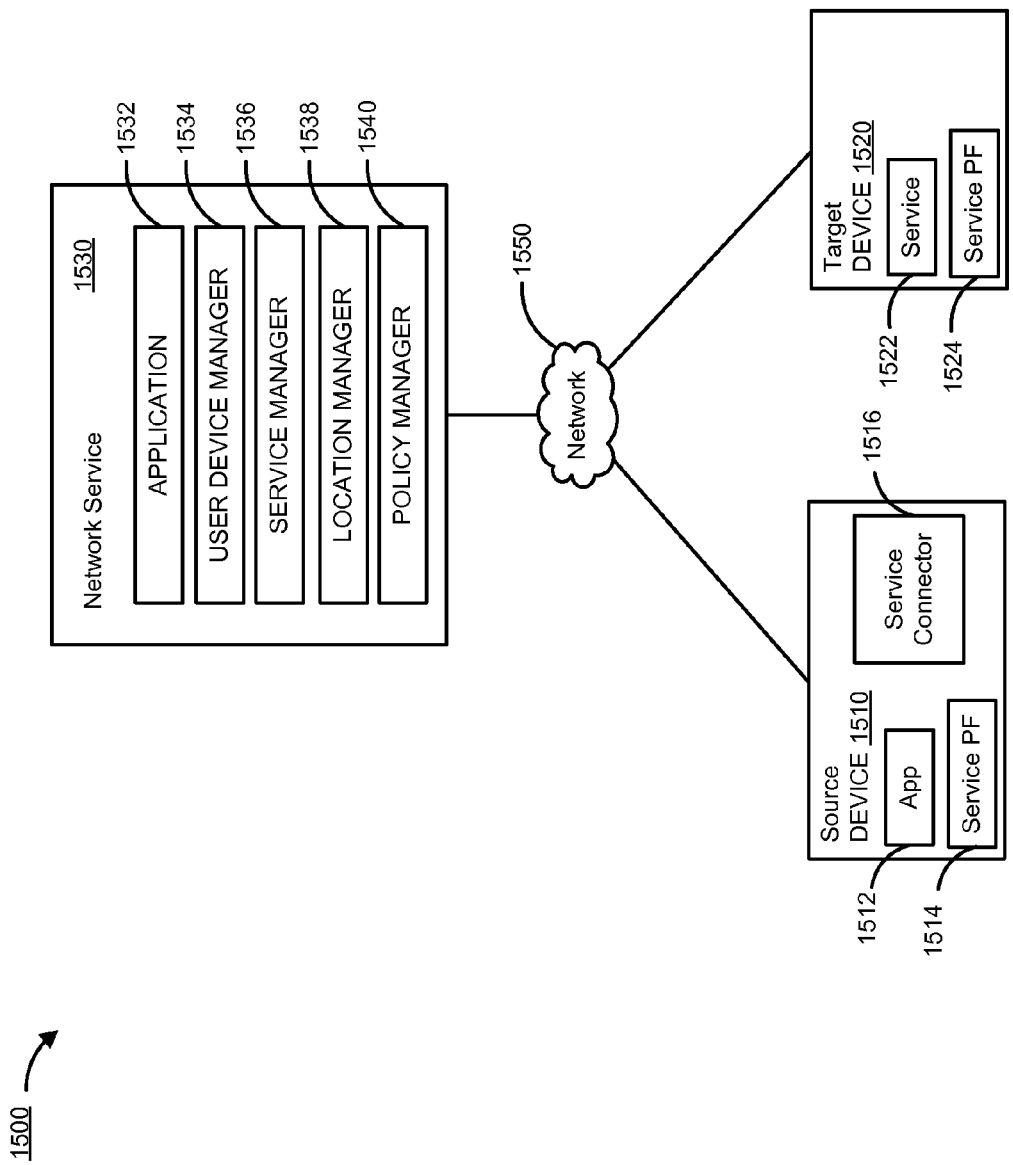
FIG. 15 is a block diagram that depicts an example architecture that manages use of one or more network resources, in an embodiment.

FIG. 15 is a block diagram that depicts an example architecture 1500 that manages access to one or more network services, in an embodiment. Architecture 1500 includes a source device 1510, a target device 1520, a network service 1530, and a network 1550. Source device 1510, target device 1520, and network service 1530 are communicatively coupled to network 1550. Network 1550 may be implemented by any medium or mechanism that provides for the exchange of data between source device 1510, target device 1520, and network service 1530. Examples of network 1550 include, without limitation, a network such as a Local Area Network (LAN), Wide Area Network (WAN), Ethernet or the Internet, or one or more terrestrial, satellite or wireless links.

Source device 1510 and target device 1520 may be in the same subnet, different subnets, or different networks entirely.

Source device 1510 includes an application 1512, a service platform 1514, and a service connector 1516. Source device 1510 may be a client device, such as a desktop computer, a laptop computer, a tablet computer, or a "smart" phone.

Target device 1520 includes a service 1522 and a service platform 1524. Examples of service 1522 include a print service, a facsimile service, a scan service, and an archive service. Examples of target device 1520 include a printer, fax machine, scanner, or multifunction peripheral that performs one or more of those functions.

Network service 1530 may consist of one or more devices. Network service 1530 includes five elements: application 1532, user device manager 1534, service manager 1536, location manager 1538, and policy manager 1540. Each of the five elements may be implemented in software, hardware, or a combination of hardware and software. Although depicted as separate elements, applications 150 and 160, user device manager 170, location manager 180, and policy manager 190 may be implemented on a single computing device or on two or more computing devices that are communicatively coupled to each other.

Figure 16:
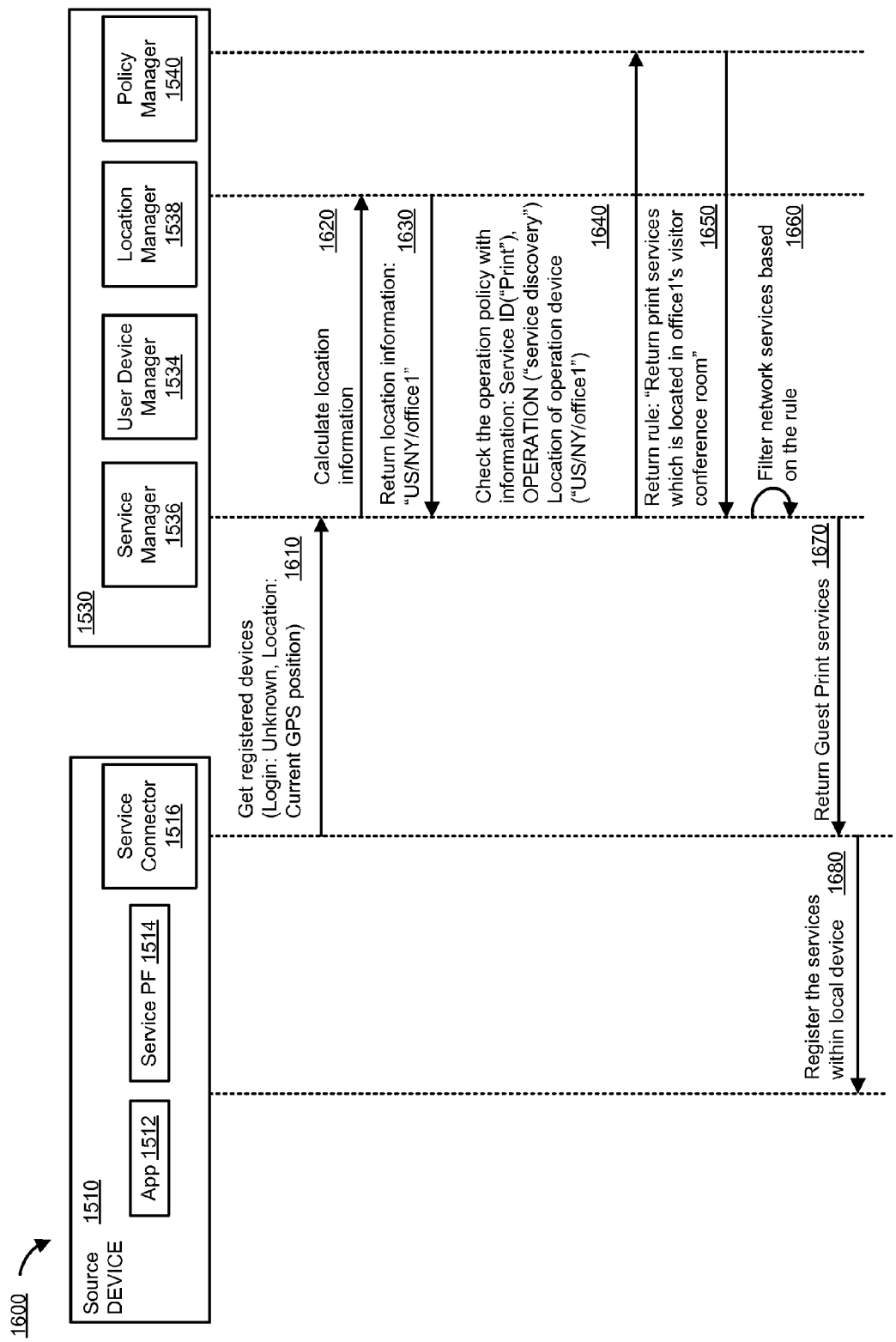
FIG. 16 is a sequence diagram that depicts how a source device discovers registered network services using one or more rules, in an embodiment.

FIG. 16 is a sequence diagram 1600 that depicts how a source device discovers registered network services using one or more rules, in an embodiment. At step 1610, service connector 1516 sends a request for currently available (e.g., registered) services. The request may include (1) login information that indicates a username and password and (2) location information that indicates a current location of source device 1510, such as GPS information. One or more of the parameters of request may be static while one or more other parameters may be dynamic.

In an embodiment, prior to sending the request, service connector 1516 may query a component(s) (not shown) of source device 1510 for current location information and/or login information. If the request from service connector 1516 to service manager 1536 does not include login information, then a corresponding value for the login information may be "Unknown." Similarly, if service connector 1516 does not have access to the current location of source device 1510, then the request from service connector 1516 to service manager 1536 may indicate "Unknown" for the location information. The request may also specify the types of services for which the source device 1510 is searching. For example, the request may indicate printing, scanning, faxing, archiving, or any. If a type of service is not specified, then the default service type may be "Any."

Service connector 1516 may initiate the request when service connector 1516 (or another component of source device 1510) detects a new network. A "new" network may be a network that service connector 1516 has never detected before. Alternatively, a "new" network may be a network that service connector 1516 has just detected (e.g., in response to a change in networks), but has detected previously.

Additionally or alternatively, service connector 1516 may initiate the request periodically (e.g., every 10 minutes or every hour) regardless of whether a new network is detected.

The request may be part of a multicast message that is sent to all devices on a network and that notifies the devices that source device 1510 is searching for available services.

Additionally or alternatively, service connector 1516 initiates the request in response to receiving a HELLO message from network service 1530 or a component thereof, such as service manager 1536.

In an embodiment, a listener process on network service 1530 may receive the request from service connector 1516 and determine to which component the request will be forwarded. In such an embodiment, the listener process forwards the request to service manager 1536.

At step 1620, in response to receiving the request, service manager 1536 sends a location determination request to location manager 1538.

At step 1630, in response to receiving the location determination request, location manager 1538 determines a location of source device 1510 and returns location data that indicates the location to service manager 1536. The current location of source device 1510 may be determined based on location information indicated in the original request from service connector 1516.

Alternatively, step 1630 may involve location manager 1538 communicating with source device 1510 (or, more specifically, service connector 1516) regarding its current location. For example, step 1630 may involve source device 1510 sending GPS or other location-related information to location manager 1528.

Regardless of how location manager 1538 determines the current location of source device 1510, location manager 1538 uses the location information received from source device 1510 to identify an area that includes the location of the source device 1510. For example, the location information from source device 1510 may be specific geographical coordinates whereas the area identified by location manager 1538 may include an approximately-defined geographic area encompassing a square mile. Thus, location manager 1538 may maintain a mapping that maps a geographical location (e.g., "IN_RANGE('NEW_YORK_STATE')" and "AROUND('43.4369659652182', '−75.904541015625', 30)") to location identifiers (e.g., "US/NY" or "US/NY/office02"). Functions "IN_RANGE" and "AROUND" take input (such as a label, in the case of "IN_RANGE" or geographical coordinates and a radius, in the case of "AROUND") and return a Boolean value: true or false. Thus, the area identified by location manager 1538 maps to a label that is recognizable by policy manager 1540. If location manager 1538 is unable to identify an area, then the location of source device 1510 may be considered "Unknown."

At step 1640, in response to receiving location data from location manager 1538, service manager 1536 sends source device-related data to policy manager 1540. The source device-related data may indicate a service type identifier, an operation identifier, and a location of the requesting device (i.e., source device 1510 in this example). The service type identifier in this example is "Print." The operation identifier may identify a type of operation that service connector 1516 is requesting. In this example, the operation is serviceDiscovery( ). Other examples of operations may include operations to execute a print function, show an image/movie file to a display device, and display a document list. Also, in this example, the source device-related data does not include a user or group identifier. This may occur if source device 1510 is a mobile device (such as a laptop, tablet computer, or smartphone) and detects a network in which source device 1510 has not detected previously or is not registered.

For example, a business traveler with a tablet computer may enter an office building that the business has not entered before and desires to print one or more documents from his/her tablet computer before the start of a meeting in a conference room of the office building. The business traveler operates the tablet computer to discover printing devices that may be used to perform the printing. A network service (such as network service 1530) allows the tablet computer to print to (or even identify) a limited set of printers. For example, some printers may be in the same subnet as the tablet computer but, for various reasons, a network administrator desires to keep those printers from being used by unknown or transient users.

At step 1650, in response to receiving the source device-related data, policy manager 1540 uses the source-related data to identify a rule that determines what information is to be provided to source device 1510. A description of rule information is as follows.

Rule Information

FIGS. 17 and 18 are block diagrams that depict example associations between operations, users, locations, device attributes, and specific rules, in an embodiment. A "rule" is an association between a set of one or more conditions and a set of one or more actions. The set of one or more actions of a rule are performed only after all conditions in the corresponding set of one or more conditions are satisfied. Thus, for example, in table 1700, the action of the (first) entry or row associated with Rule ID "App1_login_rule_ok" is performed only after (1) the operation "login( )" supported by (2) application "Application1" is requested, the user that requested the operation is (3) from Group1, and the user's device is (4) in either location US/NY/office1 or US/NY/office2. Other rules may have more or less conditions that must be satisfied in order for the associated actions to be performed.

Alternatively, a rule may be associated with multiple conditions where only one condition (or a strict subset of the conditions) must be satisfied in order to trigger performance of the associated action(s).

Table 1700 depicted in FIG. 17 includes eight fields or columns: an Application/Service Type field, an Operation field, a User/Group field, an Operation Device Location field, an Operation Device Attribute field, a Related Device Location field, a Related Device Attribute field, and a Rule ID field. In some embodiments, table 1700 includes additional fields. In other embodiments, table 1700 includes fewer fields. For example, if network service 1530 only provides a single application or if rules are relevant to only a single application hosted by network service 1530, then the Application/Service Type field is optional. As another example, if the location of a user's device is not relevant or important for any rule, then the Operation Device Location field is optional. As another example, if no rule requires a user's device to be certified or otherwise satisfy certain criteria, then the Operation Device Attribute field is optional.

The Operation field of table 1700 includes names of operations that may be performed by the corresponding application or service. For example, many rules are associated with one or more of the following three operations supported by Application1: login( ), listDocument( ), and print( ). One rule is associated with each of the following two operations supported by Application2: operation1( ) and operation2( ). Application1 and Application2 may support other operations with which no rules are associated. One rule is associated with each of the following three operations supported by a print service: serviceDiscovery( ), submitPrintJob( ), and cancelPrintJob( ).

Some rules are limited to certain users or groups of users. The User/Group field specifies a particular user or user group for a given set of one or more rules. However, for some rules, a specific user or groups is irrelevant. For such rules, the User/Group field specifies the all-inclusive "ANY".

The Operation Device Location field indicates a label for a geographical region. The labels in the Operation Device Location field may correspond to location identifiers in a Location ID field of a different table (not depicted). Alternatively, range definitions may be specified in the Operation Device Location field of table 1700. In such an embodiment, another data structure that contains location information might not be required.

In an embodiment, instead of a single table 1700, the information contained in table 1700 is partitioned or divided into multiple tables (or other storage objects). For example, given the information in table 1700, three tables may be created, one for each application or service (i.e., Application1, Application2, and Print). In those tables, an Application/Service Type field is not necessary. As another example, a different table is created for each operation. Thus, given the information in table 1700, eight tables may be created in this example: one for each of login( ), listDocument( ), print( ), operation1( ), operation2( ), service Discovery( ), submitPrintJob( ), and cancelPrintJob( ).

Table 1800 depicted in FIG. 18 includes two fields or columns: a Rule ID field and a Rule field. The Rule ID field of FIG. 18 corresponds to the Rule ID field of FIG. 17. Each rule indicates a set of one or more actions that application1, application2, or service 1522 is to perform. For example, the first rule in table 1800 indicates one action or operation: "Verify user name and password." A rule in table 1800 may additionally specify a condition that must be satisfied in order for a corresponding action to be performed. For example, a rule in table 1800 may indicate that the action is "Show the error message" if the level of a target document is level1 and that if the level of the target document is not level1, then the action "Print the document to the printer" is performed.

In an embodiment, tables 1700 and 1800 are combined such that table 1700 includes the Rule field of table 1800. In this embodiment, the Rule ID field becomes unnecessary and may be excluded in such a combined table.

Embodiments are not limited to how rule information is stored. For example, instead of one or more tables, such rule information may be stored in a linked-list, a set of non-relational objects, or a multi-dimensional array.

With tables 1700 and 1800, an administrator is able to define rules that restrict which source devices are authorized to access which network services. For example, visitors to an office may only be allowed to use one specific printer service while employees of the office are able to use all printer servers in the office.

Managing Access to Network Services (Cont.)

At step 1670, service manager 1536 sends the filtered list of services to service connector 1516.

At step 1680, in response to receiving the filtered list, service connector 1516 registers the services in the list by sending the list of services to service platform 1514.

In an embodiment, if any of the services in the list are in a different subnet than the subnet in which source device 1510 is located, then service connector 1516 may replace an IP address of the service with a dummy address that indicates that the service is hosted on source device 1510.

Thus, in sequence diagram 1600, a source device 1510 discovers one or more network services (which may or may not be in the same subnet as source device 1510) through network service 1530, even though one or more of the network services are not hosted by network service 1530. In other words, source device 1510 does not discover the network services (e.g., service 1522) by communicating directly with the target devices that host the network services.

In a related embodiment, instead of sending a filtered list of currently available services in response to the initial request from service connector 1516, network service 1530 sends a list of all currently available services to service connector 1516. Thus, service manager 1536 does not request location information from location manager 1538 or send source device-related data to policy manager 1540. In this way, application 1512 is able to "see" all currently available services. This is referred to herein as the "filter second" approach. In contrast, the approach where source device 1510 receives a filtered list of services in response to an initial request for services is referred to herein as the "filter first" approach.

In the filter second approach, if application 1512 requests a service (e.g., service 1522) that an administrator of network service 1530 does not want source device 1510 (or other "unknown" devices) to use, then the service request from application 1512 is sent (by service connector 1516) to service manager 1536, which (1) determines a current location of source device 1510 (by communicating with location manager 1538) and (2) sends source device-related data to policy manager 1540. Upon receiving a list of (e.g., print) services from policy manager 1540 (or upon identifying a list of print services based on a rule action received from policy manager 1540), service manager 1536 determines whether the requested service is in the list of services. If so, then service manager 1536 allows the service request to be sent to the requested service (e.g., service 1522). For example, service manager 1536 forwards the service request (sent from service connector 1516) to service 1522. Service manager 1536 may modify the service request such that service 1522 responds to the service request by addressing source device 1510 (or application 1512).

If service manager 1536 determines that the requested service is not in the list of services, then service manager 1536 does not allow the service request to be sent to the requested service. Instead, service manager 1536 may send, to source device 1510, a response message that indicates that the requested service is not available for use.

In the filter second approach, service manager 1536 may act as an intermediary when source device 1510 sends a service request for service 1522 hosted by target device 1520. Thus, the service request from source device 1510 is directed (via service connector 1516) to service manager 1536 and service manager 1536 forwards the service request to service 1522.

In the filter first approach, if target device 1520 is in the same subnet as source device 1510, then a service request from application 1512 may be sent to service 1522 without going through network service 1530. Alternatively, even if target device 1520 and source device 1510 are in the same subnet, network service 1530 may be enforced as an intermediary by modifying the service discovery scope of service platform 1514. Modifying the service discovery scope involves changing one or more the configurations of the discovery behavior of the service platform. A service platform has a service discovery feature and the default service discovery scope may be the local subnet. Thus, such a service platform automatically discovers the services working on the same subnet. If the service discovery scope is changed from a local subnet to within the local device, then service platform 1514 is unable to discover service 1522 within the local subnet. However, service platform 1514 is able to discover services working on the same device.

If target device 1520 is in a different subnet than source device 1510, then network service 1530 may act as an intermediary, such that a service request from application 1512 is directed to service manager 1536, which forwards the service request to service 1522.

Implementation Mechanisms

According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 19:
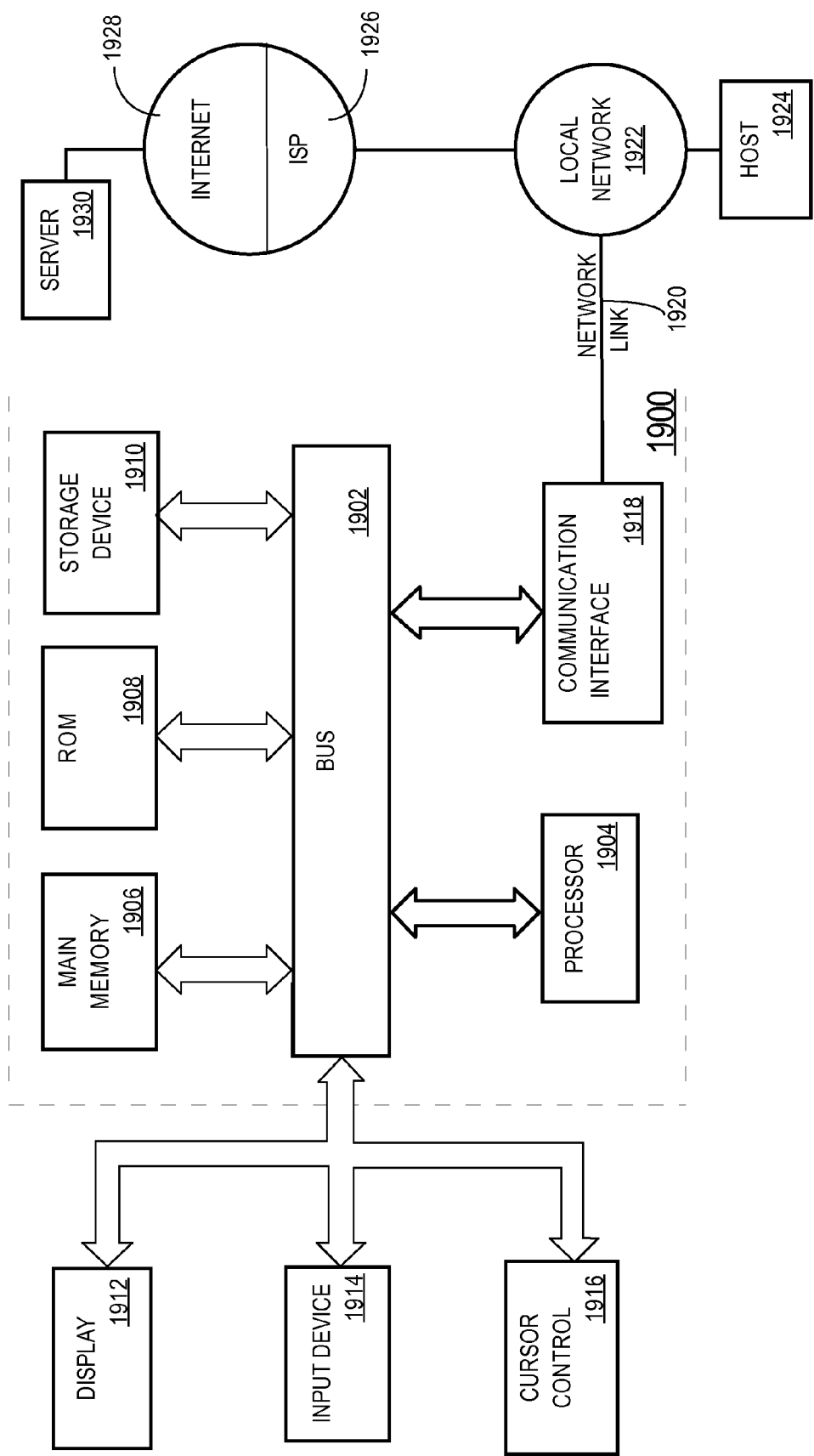
FIG. 19 is a block diagram of a computer system on which embodiments of the invention may be implemented.

FIG. 19 is a block diagram that depicts an example computer system 1900 upon which embodiments of the invention may be implemented. Computer system 1900 includes a bus 1902 or other communication mechanism for communicating information, and a processor 1904 coupled with bus 1902 for processing information. Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a cathode ray tube (CRT), for displaying information to a computer user. Although bus 1902 is illustrated as a single bus, bus 1902 may comprise one or more buses. For example, bus 1902 may include without limitation a control bus by which processor 1904 controls other devices within computer system 1900, an address bus by which processor 1904 specifies memory locations of instructions for execution, or any other type of bus for transferring data or signals between components of computer system 1900.

An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

Computer system 1900 may implement the techniques described herein using customized hard-wired logic, one or more ASICs or FPGAs, firmware and/or program logic or computer software which, in combination with the computer system, causes or programs computer system 1900 to be a special-purpose machine. According to one embodiment of the invention, those techniques are performed by computer system 1900 in response to processor 1904 executing one or more sequences of one or more instructions contained in main memory 1906. Such instructions may be read into main memory 1906 from another computer-readable medium, such as storage device 1910. Execution of the sequences of instructions contained in main memory 1906 causes processor 1904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operate in a specific manner. In an embodiment implemented using computer system 1900, various computer-readable media are involved, for example, in providing instructions to processor 1904 for execution. Such a medium may take many forms, including but not limited to, non-volatile media and volatile media. Non-volatile media includes, for example, optical or magnetic disks, such as storage device 1910. Volatile media includes dynamic memory, such as main memory 1906. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918. The received code may be executed by processor 1904 as it is received, and/or stored in storage device 1910, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    sending, from a service connector executing on a source device, to a service manager that executes on a device that is different than the source device, a request for service information;
    after sending the request for service information, receiving, from the service manager, at the service connector, first service information that indicates a first address of a first service that is hosted by a target device and that is located in a second subnet that is different than a first subnet in which the source device is located;
    in response to receiving the first service information, the service connector:
        storing the first service information, wherein storing the first service information comprises storing an association that associates a second address with the first address, and
        sending a portion of the first service information to a service platform of the source device;
    after sending the portion to the service platform of the source device, the service connector:
        receiving, from an application that is different than the service platform and that executes on the source device, a first request to use the first service, wherein the first request includes the second address, and
        replacing, by the service connector of the source device, the second address with the first address;
    causing the first request, that includes the first address, to be sent to the target device;

wherein the method is performed by one or more computing devices.

2. The method of claim 1, wherein:
the first request includes an address associated with the target device;
the first request is sent to the target device by first being sent to the service manager, which forwards the first request to the target device.

3. A method comprising:
receiving, over a network from a target device that resides in a first subnet, at a service manager, first service information that indicates a first service that the target device provides;
in response to receiving the first service information, storing the first service information;
receiving, from a source device that resides in a second subnet that is different than the first subnet, at the service manager, a first request for service information;
in response to receiving the first request, the service manager:
identifying the first service information that includes a first address of the first service,
generating a response that includes the first service information, and
sending the response to the source device that includes (1) a service connector that stores the first address and an association between the first address and a second address and (2) an application that sends a second request, to use the first service, to the service connector that replaces the second address, included in the second request, with the stored first address;
receiving, from the source device, the second request that includes the first address;
wherein the method is performed by one or more computing devices.

4. The method of claim 3, wherein receiving the first service information comprises receiving the first service information from the service connector that executes on the target device and that is separate from the first service.

5. The method of claim 3, wherein receiving the first request comprises receiving the first request from the service connector that executes on the source device and that is separate from the application that executes on the source device and requests the first service.

6. The method of claim 3, further comprising:
receiving, from a second target device that resides in a third subnet that is different than the second subnet, second service information that indicates a second service that the second target device provides;
in response to receiving the second service information, storing the second service information;
wherein identifying the first service information comprises identifying the second service information;
wherein generating the response comprises generating the response that also includes the second service information.

7. The method of claim 3, further comprising:
storing a set of associations, wherein each association in the set is associated with a different service and indicates a type of a service, a device identifier, a service name, and an IP address;
wherein the set of associations includes a first association about a first device that resides in the first subnet;
wherein the set of associations includes a second association about a second device that resides in the second subnet.

8. The method of claim 3, further comprising:
storing a plurality of rules, wherein each rule of the plurality of rules indicates a service, an operation performable by the service, one or more attributes associated with a device that requests the operation, and one or more actions that are to be performed if one or more criteria are satisfied;
receiving, from a first device, a request associated with the first service;
in response to receiving the request from the first device:
identifying a first rule, of the plurality of rules, wherein attributes of associated with the request satisfies a plurality of conditions associated with the first rule;
identifying one or more first actions associated with the first rule;
causing the one or more first actions to be performed.

9. The method of claim 3, further comprising:
receiving, over the network from a second target device that resides in a third subnet that is different than the first subnet, at the service manager, second service information that indicates a second service that the second target device provides;
in response to receiving the second service information, storing the second service information;
receiving, from a second source device that resides in a subnet that is different than the third subnet, at the service manager, a second request for service information;
in response to receiving the second request, the service manager:
identifying the second service information,
generating a second response that includes the second service information, and
sending the second response to the second source device.

10. The method of claim 9, wherein the third subnet is the second subnet.

11. A network device comprising:
one or more processors;
one or more storage media storing instructions which, when executed by the one or more processors, cause:
receiving, over a network from a target device that resides in a first subnet, at a service manager, first service information that indicates a first service that the target device provides;
in response to receiving the first service information, storing the first service information;
receiving, from a source device that resides in a second subnet that is different than the first subnet, at the service manager, a first request for service information;
in response to receiving the first request, the service manager:
identifying the first service information that includes a first address of the first service,
generating a response that includes the first service information, and
sending the response to the source device that includes (1) a service connector that stores the first address and an association between the first address and a second address and (2) an application that sends a second request, to use the first service, to the service connector that replaces the second address, included in the second request, with the stored first address;
receiving, from the source device, the second request that includes the first address.

12. The network device of claim 11, wherein receiving the first service information comprises receiving the first service information from the service connector that executes on the target device and that is separate from the first service.

13. The network device of claim 11, wherein receiving the first request comprises receiving the first request from the service connector that executes on the source device and that is separate from the application that executes on the source device and requests the first service.

14. The network device of claim 11, wherein the instructions, when executed by the one or more processors, further cause:
receiving, from a second target device that resides in a third subnet that is different than the second subnet, second service information that indicates a second service that the second target device provides;
in response to receiving the second service information, storing the second service information;
wherein identifying the first service information comprises identifying the second service information;
wherein generating the response comprises generating the response that also includes the second service information.

15. The network device of claim 11, wherein the instructions, when executed by the one or more processors, further cause:
storing a set of associations, wherein each association in the set is associated with a different service and indicates a type of a service, a device identifier, a service name, and an IP address;
wherein the set of associations includes a first association about a first device that resides in the first subnet;
wherein the set of associations includes a second association about a second device that resides in the second subnet.

16. The network device of claim 11, wherein the instructions, when executed by the one or more processors, further cause:
storing a plurality of rules, wherein each rule of the plurality of rules indicates a service, an operation performable by the service, one or more attributes associated with a device that requests the operation, and one or more actions that are to be performed if one or more criteria are satisfied;
receiving, from a first device, a request associated with the first service;
in response to receiving the request from the first device:
identifying a first rule, of the plurality of rules, wherein attributes of associated with the request satisfies a plurality of conditions associated with the first rule;
identifying one or more first actions associated with the first rule;
causing the one or more first actions to be performed.

17. The network device of claim 11, wherein the instructions, when executed by the one or more processors, further cause:
receiving, over the network from a second target device that resides in a third subnet that is different than the first subnet, at the service manager, second service information that indicates a second service that the second target device provides;
in response to receiving the second service information, storing the second service information;
receiving, from a second source device that resides in a subnet that is different than the third subnet, at the service manager, a second request for service information;
in response to receiving the second request, the service manager:
identifying the second service information,
generating a second response that includes the second service information, and
sending the second response to the second source device.

18. The network device of claim 17, wherein the third subnet is the second subnet.

19. A network device comprising:
one or more processors;
one or more storage media storing instructions which, when executed by the one or more processors, cause:
sending, from a service connector executing on a source device, to a service manager that executes on a device that is different than the source device, a request for service information;
after sending the request for service information, receiving, from the service manager, at the service connector, first service information that indicates a first address of a first service that is hosted by a target device and that is located in a second subnet that is different than a first subnet in which the source device is located;
in response to receiving the first service information, the service connector:
storing the first service information, wherein storing the first service information comprises storing an association that associates a second address with the first address, and
sending a portion of the first service information to a service platform of the source device;
after sending the portion to the service platform of the source device, the service connector:
receiving, from an application that is different than the service platform and that executes on the source device, a first request to use the first service, wherein the first request includes the second address, and
replacing, by the service connector of the source device, the second address with the first address;
causing the first request, that includes the first address, to be sent to the target device.

20. The network device of claim 19, wherein:
the first request includes an address associated with the target device;
the first request is sent to the target device by first being sent to the service manager, which forwards the first request to the target device.

* * * * *